(12) United States Patent
Zeiter et al.

(10) Patent No.: US 6,494,491 B1
(45) Date of Patent: Dec. 17, 2002

(54) OBJECT WITH AN OPTICAL EFFECT

(75) Inventors: Patrik Zeiter, Zürich (CH); Markus Lüthi, Marthalen (CH); Wolfgang Lohwasser, Gailingen (DE)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/719,628

(22) PCT Filed: Jun. 9, 1999

(86) PCT No.: PCT/CH99/00251

§ 371 (c)(1),
(2), (4) Date: Dec. 15, 2000

(87) PCT Pub. No.: WO00/00356

PCT Pub. Date: Jan. 6, 2000

(30) Foreign Application Priority Data

Jun. 26, 1998 (EP) .............................................. 98810590

(51) Int. Cl.[7] .............................................. B42D 15/00
(52) U.S. Cl. .............................. 283/91; 40/626; 283/94; 359/2; 428/42.1
(58) Field of Search .......................... 40/625, 626, 630; 283/81, 91, 94, 107, 108; 428/29, 41.7, 42.1; 359/2

(56) References Cited

U.S. PATENT DOCUMENTS

| | | | |
|---|---|---|---|
| 4,503,110 A | * | 3/1985 | Skene .......................... 156/209 |
| 4,506,915 A | * | 3/1985 | Haghiri-Tehrani et al. .. 283/108 |
| 4,632,430 A | | 12/1986 | Wicker |
| 4,662,653 A | | 5/1987 | Greenaway |
| 4,837,061 A | * | 6/1989 | Smits et al. ................. 283/108 |
| 4,879,161 A | * | 11/1989 | Raymond et al. ........... 101/229 |
| 5,651,615 A | * | 7/1997 | Hurier .......................... 283/72 |
| 5,766,738 A | * | 6/1998 | Phillips et al. .............. 428/200 |
| 5,851,032 A | * | 12/1998 | Green .......................... 283/72 |
| 6,337,752 B1 | * | 1/2002 | Heckenkamp et al. ........ 283/86 |

FOREIGN PATENT DOCUMENTS

EP 0 778 159 6/1997

* cited by examiner

Primary Examiner—A. L. Wellington
Assistant Examiner—Monica Carter
(74) Attorney, Agent, or Firm—Fisher, Christen & Sabol

(57) ABSTRACT

An item with a surface area creating an optical effect is such that the surface area with the optical effect exhibits at least two images (12, 14) separated a distance (d) from each other by means of a transparent layer of material (10). The distance (d) between the images 12, 14 and the distance (a) between two neighboring elements (16) forming the images (12, 14) are adjusted with respect to each other such that on altering the viewing angle (α) the perceived overall image formed by the overlapping of the images (12, 14) is altered. A preferred application for the item lies in forms of packaging, packaging material, an aid to packaging, bonds or entry tickets with forgery-proof surface area and/or surface areas that have to meet high demands.

45 Claims, 2 Drawing Sheets

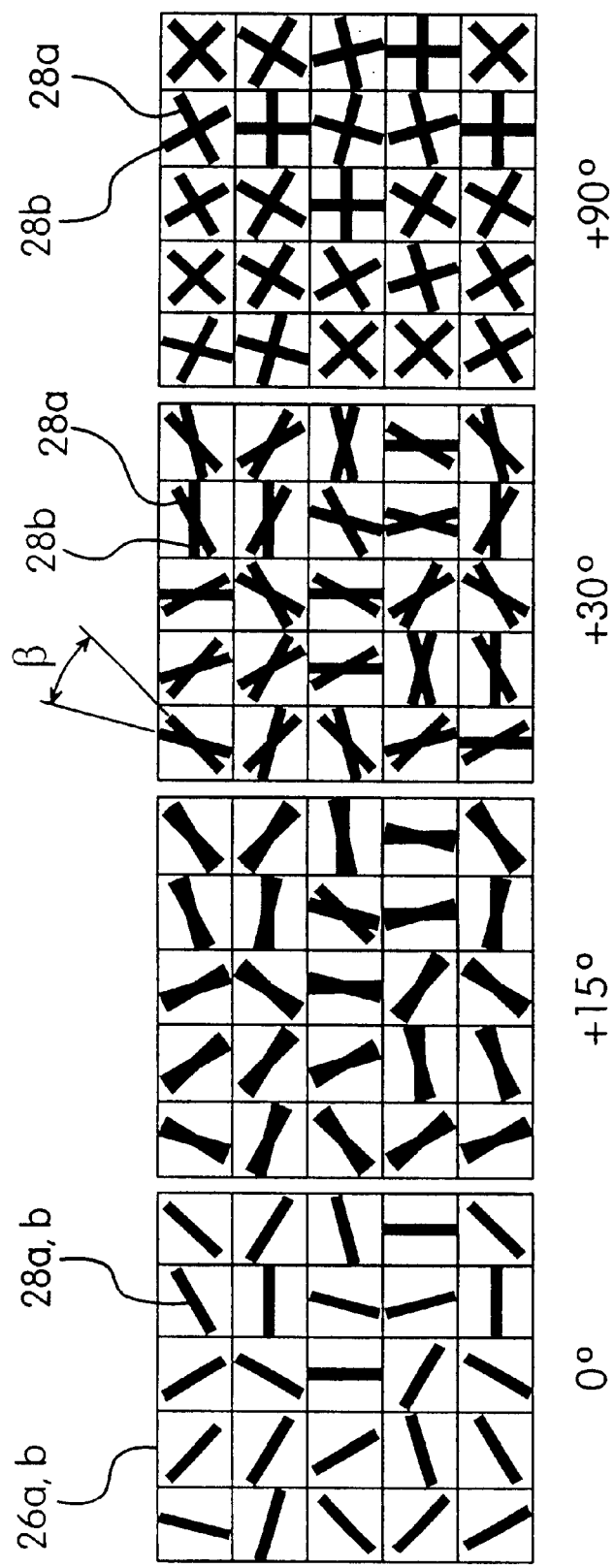

OBJECT WITH AN OPTICAL EFFECT

BACKGROUND OF THE INVENTION

1. Field of the Invention

The invention relates to an item with a surface area exhibiting an optical effect. Also within the scope of the invention is a process for manufacturing the item and the use thereof.

2. Background Invention

Proof against forgery in packaging is of great importance especially for the pharmaceutical industry. Basically, however, in other branches of industry there is a wish for forgery-proof packaging or products, in particular in the consumer industry, e.g., the packaging of foodstuffs, cosmetic items, clothes, software and music CDs or bonds. The item with the surface area exhibiting the optical effect may be packaging, packaging material, an aid to packaging or a product itself on which a surface area is provided with a security part, e.g., in the form of a label bearing an optical effect.

Forgery-proof packaging or packaging material may serve as guarantee of origin, enabling the customer to recognize that the purchased item was actually manufactured and packaged by the desired manufacturer. Forgery-proof packaging material may also be used as guarantee of first opening, e.g., in the form of a label, band or sealing strip, etc., which has, e.g., been affixed to the goods over a bottle closure or over a closure on a wide-necked glass, across a seam between a lid and a container or over the tear-off closure on a pouch. On opening the packaging in question the label, band or sealing strip is broken, demonstrating that the package has already been opened. It is also possible to place objects in an outer packaging bearing characteristic, unmistakable features that cannot be copied, showing that the packaging of the contents has been performed by a particular supplier.

Known forgery-proof packaging and products are provided with holograms on their surface or they exhibit color coding or invisible features. Methods that have proved themselves in practice include, e.g., holograms. Examples are hologram labels or foil lids with integral holograms. Manufacturing holograms, however, involves enormous expenditure.

BROAD DESCRIPTION OF THE INVENTION

The object of the invention is therefore to provide at least a part of the surface of items, such as, packaging, packaging materials, packaging aids or products themselves, with an optical effect that can be produced in a cost favorable manner, but cannot be forged in a simple manner.

That objective is achieved by way of the invention in that the surface area exhibiting the optical effect exhibits at least two images separated a distance from each other by means of a transparent layer of material, and such that the distance between the images and the distance between two neighbouring elements forming the images are adjusted with respect to each other, and such that on altering the viewing angle the perceived overall image formed by the overlapping of the images is altered.

The invention makes use of a phenomenon known as the moiré effect. Moiré patterns are two dimensional images that result from the interference of two overlapping patterns. By displacing two immediately adjacent patterns, the moiré interference pattern also changes, leading to the known, changing light-dark image effects.

The present invention makes use of the changing moiré interference that occurs without mechanical displacement of the pattern. As a result of the mutual distance between the images, a spatial arrangement results, which on changing the angle of viewing leads to chang-ing moiré interference effects. By using reflecting materials it is possible, in the region of the angle of reflection, to observe a reflected image of one of the images instead of moiré interference patterns, while moiré interference occurs outside the range of the angle of reflection. The essential core of the invention lies therefore in the preparation of a three dimensional moiré pattern.

In order to create the effect according to the invention, the already known distances between neighbouring image elements in the moiré pattern have to be maintained. The said patterns may be made up of individual parallel lines or dots. In the simplest case of a line pattern the distance between neighbouring lines is always the same. In a simple arrangement two identical image patterns are arranged directly over each other and a distance from each other. It is possible, however, to displace regions of one image pattern with respect to the other image pattern e.g. by half the distance between neighbouring image elements, or to provide the first image with another pattern with the result that, on changing the angle of viewing, for example several changes from lightness to darkness and vice versa are observed. Of course images may also contain a combination of straight and curved lines or other image elements. As a result it is e.g. possible to incorporate trade names and the like signs with three dimensional moiré effects in the packaging material. In order to increase the protection against forgery further, one of the images may contain an additional structure to that of the pattern of lines. Another means of increasing protection against forgery and to conceal data is to design the image in such a manner that the additional information can be seen only after an additional filter has been superimposed on the image. Such filters are made up of a grid-type pattern, the dimensions of which are chosen to suit the dimensions of the line pattern.

The transparent layer of material that acts as a spacer between the images serves as a means of setting the desired minimum distance. This cannot be changed if the patterns are mounted immediately on the different sides or planes of the transparent material layer. If however the transparent layer lies on at least one of the images without being permanently attached there, i.e. at least one of the images is free of the layer of transparent material, then the distance from the pattern is variable and the three dimensional moiré effect is even more pronounced.

The layer of transparent material may be provided with an image on both sides. Another version is such that the layer of transparent material is made up of at least two partial layers and the images are deposited on the different partial layers. In a further version one of the images is deposited on an opaque foil e.g. an aluminium foil.

Instead of two images being deposited, one image may be the mirror image of the other. In this case one side of the layer of transparent material borders on the reflecting layer e.g. an aluminium foil with a highly reflective finish.

The images may be deposited in the form of coloured printed patterns. The printed image may be monochromatic or multi-coloured. As additional security one may employ colours that make the moiré pattern visible only under UV or IR light. Another possibility is for at least one image to be in the form of a surface structure with structural elements displaced with respect to their height e.g. as an embossed or etched pattern. Embossed or etched structures are suitable e.g. for depositing images on an aluminium foil. Embossed patterns may also be deposited on plastic or aluminium/plastic laminates using hot and/or cold embossing. Foils or laminates with an image pattern in the form of a surface structure are especially suitable for the production of tube laminates e.g. for manufacturing toothpaste tubes.

The images may also be created in the form of micro-perforations on an opaque foil, especially on an aluminium foil. The diameter or breadth of the perforations is thereby about 10 to 1000 µm, preferably 50 to 200 µm.

The images may also include basic matrix elements with individual image elements, the related image elements of different basic matrices being displaced with respect to each other in order to produce different local light-dark contrast or colours. The image preferably form patterns that produce defined light-dark contrast or colours as a result of various combinations of superposition. As these kind of images require extremely good matching of the super-imposed basic matrices to produce a good effect, this kind of image is required mainly in applications requiring a high degree of security against forgery.

The items according to the invention are manufactured using known methods. The image may be deposited e.g. by simultaneously printing on both sides of a transparent plastic film. The individual images may however also be printed on different films. The individual films, each bearing a printed image, are then joined by laminating them together to provide a packaging material. The proof against forgery is increased even further in that the laminating has to be performed on a machine with high precision control of the printing process.

At least one of the images may be deposited on a further layer of material which is free of the transparent layer of material. The optical effect is produced only when both layers of material are brought close to each other, the three dimensional moiré effect being additionally altered and reinforced. The two layers of material may e.g. be two foils or laminates that are joined together only at certain places, otherwise the other areas are able to adopt a variable distance to each other. Application possibilities are e.g. in pouch-type packaging made of two lamin-ates that are joined or sealed together only at the edges.

The item according to the invention may e.g. be any packaging material in the form of a packaging material or aid to packaging exhibiting a transparent layer of material upon which, additionally according to the invention, images have been deposited. The packaging material may be rigid, semi-rigid or flexible and may have a given shape or in particular be a foil-shaped material. Examples of shaped bodies are blown, deep-drawn and/or stretch drawn or deepened shapes such as bottles, wide-neck containers, beakers, dishes or bases of push-through packs or blister packs. Examples of foil-shaped materials are metal foils such as aluminium, steel, copper, silver or gold foils. Further examples of foil-shaped materials are papers such as silk paper having a weight per unit area of 20 to 30 g/m$^2$ or highly whitened paper with a weight per unit area of 40 to 60 g/m$^2$, cardboard, semi-cardboard or the like. Particularly important are films containing plastic e.g. plastics based on polyolefins, such as polyethylenes or polypropylenes, polyamides, polyvinylchloride, polyesters such as poly-alkylene-terephthalates and in particular polyethylene-terephthalate. The films containing plastic may be in the form of mono-films of plastic, laminates of two or more plastic films, laminates of metal and plastic films, laminates of papers and plastic films or laminates of papers and metal and plastic films. The individual plastic films may have a thickness e.g. of 12 to 200 µm and the metal foils a thickness of 12 to 100 µm. The individual layers of foil-shaped materials may be joined together by means of adhesives, laminating adhesives, bond-ing agents and/or extrusion coating, co-extrusion or laminating etc. Preferred plastic films are non-oriented or axially or biaxially oriented mono-films or laminates of two or more non-oriented or axially or biaxially oriented films of plastics based on polyolefins such as poly-ethylenes or polypropylenes, polyamides, polyvinylchloride, polyesters such as polyalkylene-terephthalates and in particular polyethylene-terephthalate.

The above mentioned packaging materials may form the items according to the invention in the form of packaging materials or aids to packaging. For example pouches, sachets, wraps, bags etc, may be manufactured out of the film-shaped packaging materials by stamping and sealing. By deep drawing and/or stretch drawing, films may be shaped into shaped packaging or shaped bodies such as bases of push-through packs or blister packs, or into wide necked containers, menu dishes, goblets, beakers etc. For example tubes (tube laminates) or lids for shaped packaging may be shaped out of the films in question. One may manufacture e.g. boxes such as collapsible boxes from cardboard type substrates. It is also possible to employ e.g. bottles blown out of plastics, or pre-formed packaging as a substrate and to apply the transparent material according to the invention to it. Closures, openings, seams, seams between a base part and the related lid etc. may be provided with a packaging material according to the invention in the form of a label, sealing strip, band, guarantee seal or outer seal. These last mentioned aids to packaging are as a rule film-shaped and are fixed to the container in question across an opening and fixed, e.g. adhesively bonded, welded, flanged or shrunk-fit onto the neighbouring part of the container. The packaging aid exhibits the trans-parent layer of material according to the invention and the images spaced apart by this. The structure according to the invention of the surface or area of surface on the item results in the specific intended optical effect on changing the angle of viewing. A forgery e.g. by photo-copying and using the photocopy as evidence of product origin or guarantee would be recog-nised immediately and easily, as changing the angle of viewing would not lead to the optical effect that is observed with the structure made according to the invention. In order that the aid to packaging e.g. sealing strip or band can be easily broken by the user, aids to tearing such as forms of weakening, notches or tear-off tabs may be provided. Also, component parts of packaging materials or aids to packaging may be employed in the form of easily torn or push-through plastic films, or plastic films containing fillers, or two poorly compatible plastic films.

Apart from the already mentioned use of the item accord-ing to the invention in the form of packaging or aid to packaging, another field of application is the forgery-proof manufacture of bonds, entry tickets and the like documents, whereby in addition to the forgery-proof design aspects it is possible to introduce special decorative effects.

BRIEF DESCRIPTION OF THE DRAWINGS

Further advantages, features and details of the invention are revealed in the following description of exemplified embodiments and with the aid of the drawing which shows schematically in:

In the Drawings:

FIG. 8 is a plan view of two superimposed images with image elements arranged displaced with respect to each other.

DETAILED DESCRIPTION OF THE DRAWINGS AND THE INVENTION

Figure 1:
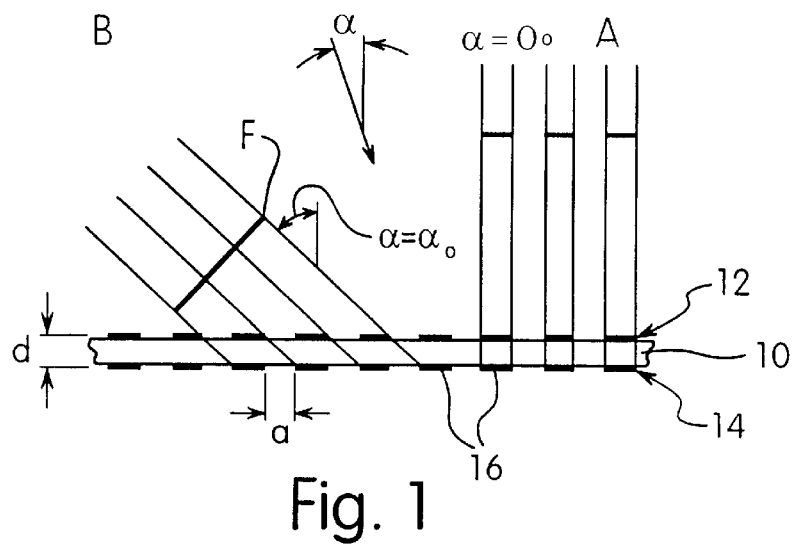
FIG. 1 shows the principle of three dimensional moiré interference, illustrated at a section through an arrangement of images according to the invention.

FIG. 1 shows a layer of transparent material 10 with images 12, 14 on both sides a distance d apart and forming a pattern of lines made up of individual lines 16. The distance a between the individual lines 16 is, in the present example, always the same and corresponds to the resolution. It can be readily seen from the figure that the observer viewing from the angle of observation $\alpha=0°$ (A) sees the image in the original form. When viewing at a certain angle $\alpha_0$ (B), the observer sees a black area F. At an angle $\alpha$ between $\alpha_0$ and $0°$, the observer sees an image with progressively increasing or decreasing width of individual lines 16. To achieve the three dimensional moiré effect, the limiting angle $\alpha$ is decisive; if it is too large, then large changes in viewing angle are necessary to observe the moiré interference, i.e., the effect is difficult to recognize. The optimum size for the limiting angle $\alpha_0$ is, e.g., $20°$. The limiting angle $\alpha_0$ is directly related to the distance d between the two images 12, 14 and to the resolution a as given by the mathematical relationship:

$$a = d.tg\ \alpha_0.$$

As the thickness of the transparent layer 10 of plastic film or films employed is usually between 7 $\mu$m and 200 $\mu$m, the result is a very fine and therefore forgery-proof resolution a. On the basis of the mathematical relation between the distance d between both images 12, 14, the thickness of the layer of transparent material 10 and the distance a between the individual lines 16, the optimum resolution can be readily calculated for a given layer structure.

Figure 2:
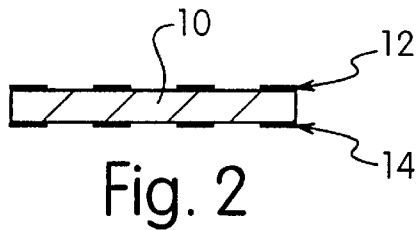
FIG. 2 is a section through an example of a film with an image arranged according to the invention.

FIGS. 2 to 7 show examples of arrangements of images. As shown in FIG. 2, a transparent plastic film 10 has images 12, 14 printed on both sides.

Figure 3:
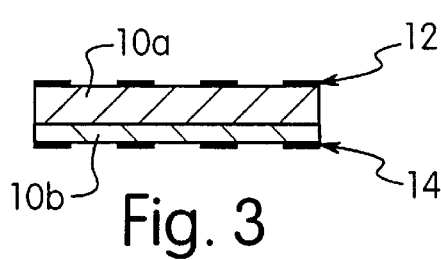
FIG. 3 is a section through another example of a film with an image arranged according to the invention.

FIG. 3 shows a transparent plastic film 10 made up of two film layers 10a, b. The images 12, 14 have been printed on the outer faces of the film layers 10a, b. Such an arrangement can be manufactured such that first both film layers 10a, b have their respective image 12, 14 printed on them, then the printed films joined together by laminating.

Figure 4:
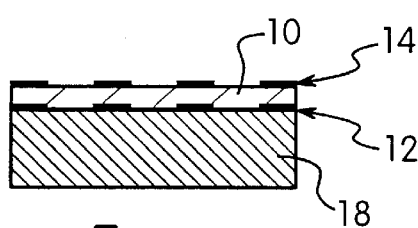
FIG. 4 is a section through another example of a film with an image arranged according to the invention.

FIG. 4 shows an aluminium foil 18 on which an image 12 has been printed. This printed aluminium foil 18 is laminated onto a transparent plastic film 10 bearing a printed image 14.

Figure 5:
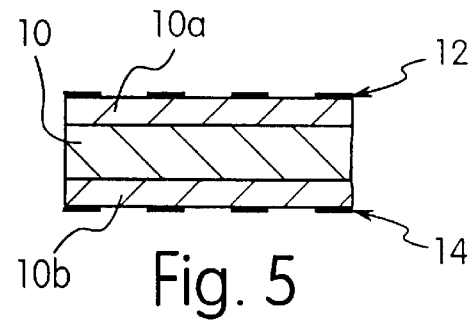
FIG. 5 is a section through another example of a film with an image arranged according to the invention.

As shown in FIG. 5 a transparent plastic film 10 has been laminated between two tranparent plastic films 10a, b each bearing an image 12, 14.

Figure 6:
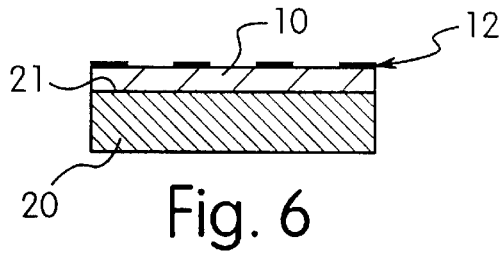
FIG. 6 is a section through another example of a film with an image arranged according to the invention.

In the example shown in FIG. 6 a transparent plastic film has been laminate bonded onto an aluminium foil 20 with a highly reflective surface 21.

In this case only the transparent plastic film 10 bears a printed image 12. The three dimensional image is created from the image 12 and its mirrored image produced by the highly reflective surface 21.

Figure 7:
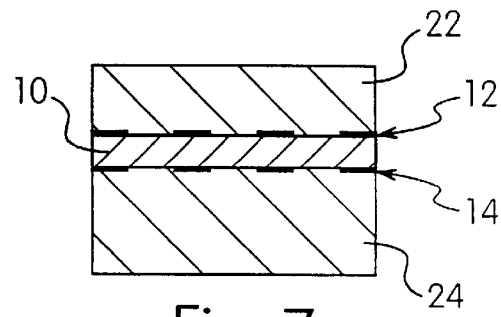
FIG. 7 is a section through a further example of a film with an image arranged according to the invention.

The arrangement shown in FIG. 7 is suitable for observing in light passing through the item in question. It corresponds to the version shown in FIG. 2 with additional outer layers 22, 24 in the form of transparent plastic films laminated onto the layer of material 10.

FIG. 8 shows the overlapping of two images in the form of an identical basic matrix 26a, b with individual elements (pixels) in the form of strokes 28. The two superimposed basic matrices 26a, b differ solely in that the individual strokes 28b of matrix 26b are rotated by an angle $\beta$ of $0°+15°$, $+30°$ and $90°$ with respect to the strokes 28a of matrix 26a. As a result of rotating the individual image elements by different degrees, additional bright-dark contrast effects are produced on altering the angle of observation, this in addition to the already present effect of changing the optical perception of the overall picture arising from over-lapping the image. On examining FIG. 8 it can be seen that increasing the angle $\beta$ between the strokes 28a, b from $0°$ to $90°$ leads continuously to darker strokes. Using suitable soft-ware it is possible to generate or code images with different levels of greyness. The matrix 26a at an angle $\beta=0°$ comprises an arrangement of individual strokes 26a the angles of which relative to the matrix have been generated at random.

The overlapping of the basic matrix with image elements displaced with respect to each other can be created very locally, this separately from a larger basic pattern. This enables sub-ordinate images to be created within a main image or pattern.

In practice the image is created e.g. by a first printed image made up of image elements that are randomly arranged but with their direction recorded in a matrix. To create a picture the image elements in a superimposed pattern are displaced with respect to each other by a certain amount, the extent of which depends on the desired grey tone. In areas of the image which should be as bright as possible, the image elements are not displaced with respect to each other, whereas in areas which should be as dark as possible the image elements are displaced to a maximum. As both printed patterns are present as images set a distance apart from each other, the image created can be observed only at a defined angle of observation $\alpha$. If image patterns made up of coloured image elements are employed, it is also possible to create different colours instead of grey tones.

The invention is not limited to the exemplified embodiments shown here, but relates rather to all items having a layer structure according to the invention in at least one area of its surface. In particular, further films or foils can supplement the structure to give a packaging material, or the layer structure according to the invention can be applied directly to a product.

What is claimed is:

1. An object with a surface region that generates an optical effect having the purpose of increasing proof against counterfeit, wherein the surface region that generates the optical effect exhibits at least two image patterns (12, 14) separated distance (d) from each other by means of a transparent layer of material (10) and, upon altering viewing angle ($\alpha$), the perceived overall image formed by the over-lapping of the image patterns (12, 14) is altered, and the distance (d) between the image patterns (12, 14) defined by a thickness of the material layer (10) and distance (a) between two neighboring image elements (16) forming the image patterns (12, 14) are adjusted with respect to each other such that the image patterns (12, 14) exhibit moiré interference effects.

2. The object according to claim 1, wherein at least one of the images (12, 14) is not attached to the layer of transparent material (10).

3. The object according to claim 2, wherein the layer of transparent material (10) is provided with an image (12, 14) on each side.

4. The object according to claim 2, wherein the layer of transparent material (10) is made up of at least two partial layers (10a, b) and the images (12, 14) are situated on different partial layers (10a, b).

5. The object according to claim 2, wherein one of the images (12) is situated on an opaque foil.

6. The object according to claim 5, wherein one of the images (12) is situated on an opaque aluminum foil (18).

7. The object according to claim 1, wherein the layer of transparent material (10) neighbors on one side on a reflecting layer and a second image is a mirror image of a first image (12).

8. The object according to claim 7, wherein the reflecting layer is an aluminum foil (20) with a highly reflective surface (21).

9. The object according to claims 8, wherein the layer of transparent material (10) is reflective with the result that within the angle of reflection a reflected image is seen and outside of the angle of reflection moiré interference is observed.

10. The object according to claim 9, wherein at least one image (12, 14) is deposited as a color-printed image.

11. The object according to claim 10, wherein at least one image (12, 14) is a color-printed image that can be observed only under ultraviolet or infrared light.

12. The object according to claim 11, wherein at least one image (12, 14) is in the form of a surface structure with Arts of the structure at different heights.

13. The object according to claim 12, wherein at least one image (12, 14) is formed by hot or cold embossing.

14. The object according to claim 13, wherein at least one image (12, 14) is deposited in the form of micro-perforation on an opaque foil.

15. The object according to claim 14, wherein the opaque foil is an aluminum foil.

16. The object according to claim 14, wherein diameter or width of the micro-perforation is 10 to 100 µm.

17. The object according to claim 14, wherein diameter or width of the micro-perforations is 50 to 200 µm.

18. The object according to claim 12, wherein at least one image (12, 14) is deposited as an embossed or etched pattern.

19. The object according to claim 18, wherein at least one image (12, 14) is formed by hot or cold embossing.

20. The object according to claim 19, wherein at least one image (12, 14) is deposited in the form of micro-perforation on an opaque foil.

21. The object according to claim 20, wherein the diameter or the width of the perforations is approximately 10 to 100 µm.

22. The object according to claim 16, wherein regions of one image (14) are displaced with respect to the other image (12).

23. The object according to claim 22, wherein regions of one image (14) are displaced with respect to the other image (12) by half of the distance (a) between neighboring image elements (16).

24. The object according to claim 22, wherein the image (12, 14) of the basic image (26a, b) is made up of individual elements (28a, ) such that interrelated elements of different basic patterns are arranged displace with respect to each other in order to create locally different bright-dark contrast or colors.

25. The object according to claim 24, wherein the image element patterns (28a, b) form the defined light-dark contrasts or colors resulting from the different combinations of overlapping.

26. The object according to claim 25, wherein the images (12, 14) are arranged such that at least a part of the optical effect becomes visible only after applying a filter with a mesh-type pattern having dimensions attuned to the dimensions of the images (12, 14).

27. The object according to claim 1, wherein the layer of transparent material (10) is provided with an image (12, 14) on each side.

28. The object according to claim 1, wherein the layer of transparent material (10) is made up of at least two partial layers (10a, b) and the images (12, 14) are situated on different partial layers (10a, b).

29. The object according to claim 1, wherein one of the images (12) is situated on an opaque foil, in particular on an aluminum foil (18).

30. The object according to claim 1, wherein the layer of transparent material (10) neighbors on one side on a reflecting layer and a second image is a mirror image of a first image (12).

31. The object according to claim 30, wherein the reflecting layer is an aluminum foil (20) with a highly reflective surface (21).

32. The object according to claim 1, wherein the layer of transparent material (10) is reflective with the result that within the angle of reflection a reflected image is seen and outside the angle of reflection moiré interference is observed.

33. The object according to claim 1, wherein at least one image (12, 14) is deposited as a color-printed image.

34. The object according to claim 33, wherein at least one image (12, 14) is a color-printed image that can be observed only under ultraviolet or infrared light.

35. The object according to claim 1, wherein at least one image (12, 14) is in the form of a surface structure with parts of the structure at different heights.

36. The object according to claim 1, wherein regions of one image (14) are displaced with respect to the other image (12), in particular by half of the distance (a) between neighboring image elements (16).

37. The object according to claim 36, wherein regions of one image (14) are displaced with respect to the other image (12) by half of the distance (a) between neighboring image elements (16).

38. The object according to claim 36, wherein the image (12, 14) of the basic image (26a, b) is made up of individual elements (28a, b) such that interrelated elements of different basic patterns are arranged displace with respect to each other in order to create locally different bright-dark contrast or colors.

39. The object according to claim 38, wherein the image element patterns (28a, b) form the defined light-dark contrasts or colors resulting from the different combinations of overlapping.

40. The object according to claim 1, wherein the images (12, 14) are arranged such that at least a part of the optical effect becomes visible only after applying a filter with a mesh-type pattern having dimensions attuned to the dimensions of the images (12, 14).

41. A process for manufacturing an object with a surface region that generates an optical effect having the purpose of increasing proof against counterfeit, wherein the surface region that generates the optical effect exhibits at least two image patterns (12, 14) separated distance (d) from each other by means of a transparent layer of material (10) and, upon altering viewing angle ($\alpha$), the perceived overall image formed by the overlapping of the image patterns (12, 14) is altered, and the distance (d) between the image patterns (12, 14) defined by a thickness of the material layer (10) and distance (a) between two neighboring image elements (16) forming the image patterns (12, 14) are adjusted with respect to each other such that the image patterns (12, 14) exhibit moiré interference effects, comprising depositing the images (12, 14) on different partial layers (10*a, b*) and combining images (12, 14) by laminating partial layers (10*a, b*) to a material layer (10).

42. The process according to claim 41, wherein images (12, 14) are printed on both sides of a plastic film (12, 14).

43. The process according to claim 41, wherein at least one of the images (12, 14) is not attached to transparent material (10).

44. The process according to claim 41, wherein at least one of the images (12, 14) is deposited separate from the layer (10) of transparent material.

45. A process for manufacturing an object with a surface region that generates an optical effect having the purpose of increasing proof against counterfeit, wherein the surface region that generates the optical effect exhibits at least two image patterns (12, 14) separated distance (d) from each other by means of a transparent layer of material (10) and upon altering viewing angle ($\alpha$), the perceived overall image formed by the overlapping of the image patterns (12, 14) is altered, and the distance (d) between the image patterns (12, 14) defined by a thickness of the material layer (10) and distance (a) between two neighboring image elements (16) forming the image patterns (12, 14) are adjusted with respect to each other such that the image patterns (12, 14) exhibit moiré interference effects, comprising depositing the images (12, 14) on different partial layers (10*a, b*), combining images (12, 14) by laminating partial layers (10*a, b*) to a material layer (10), and forming such laminate into the form of packaging, packaging material, auxiliary packaging material, bonds or tickets for admission with forgery-proof and/or optically demanding surface regions.

* * * * *